No. 714,182. Patented Nov. 25, 1902.
I. W. HOOVER.
CUTTER HEAD FOR WOOD FIBER MACHINES.
(Application filed June 19, 1901.)

(No Model.)

WITNESSES:
F. M. Dotson
L. E. Brown

INVENTOR.
Ira Wilson Hoover,
By his Atty.,

UNITED STATES PATENT OFFICE.

IRA WILSON HOOVER, OF PERRYSBURG, OHIO.

CUTTER-HEAD FOR WOOD-FIBER MACHINES.

SPECIFICATION forming part of Letters Patent No. 714,182, dated November 25, 1902.

Application filed June 19, 1901. Serial No. 65,101. (No model.)

*To all whom it may concern:*

Be it known that I, IRA WILSON HOOVER, a citizen of the United States, residing at Perrysburg, in the county of Wood and State of Ohio, have invented certain new and useful Improvements in Cutter-Heads for Wood-Fiber Machines; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to cutter-heads for that class of wood-fiber machines in which a gang of saws, known as "wabble-saws," secured to a shaft or mandrel operating upon the surface of a bolt or log of wood reduces the log to a fiber of greater or less fineness.

The object of my invention is to provide an arrangement and form of saws forming a cutter-head for a wood-fiber machine which shall be strong and effective and which will largely reduce the vibration heretofore encountered in the use of saws of this class. I attain these objects by means of the devices and arrangement of parts hereinafter described, and shown and illustrated in the accompanying drawings, in which—

Figure 1:
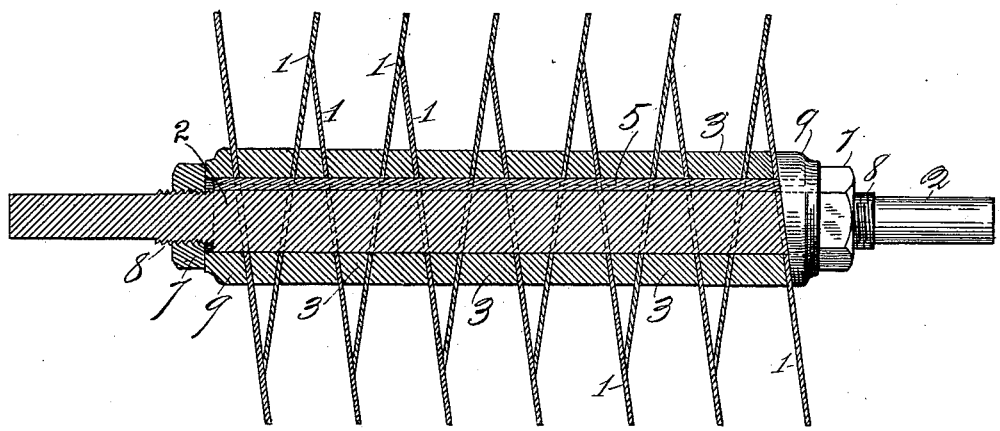
Figure 2:
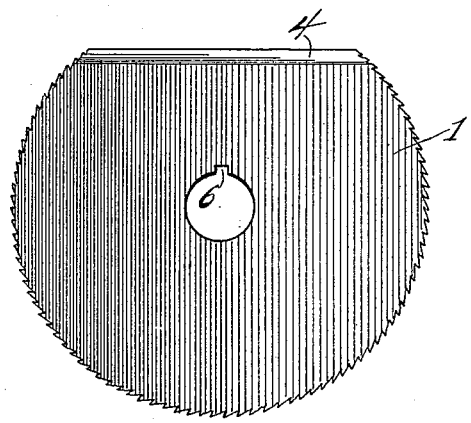

Figure 1 is a central vertical longitudinal sectional elevation of a cutter-head constructed according to my invention, and Fig. 2 a side elevation of one of my saws hereinafter referred to detached.

My cutter-head consists of a series of saws 1, secured upon a shaft or mandrel 2. The saws are separated by a series of sleeves or blocks 3. The saws instead of being in the usual circular form have their toothed rims formed in the arc of a circle, as illustrated in Fig. 2, the chord of the arc being without teeth. The saws are successively disposed at opposite acute angles to each other, each saw having its straight edge resting against its neighbor, the two series of straight edges lying in parallel planes. The straight edges of the saws are beveled, as at 4, to conform to the inclination of the saw against which the straight edge rests. One of the saws may be formed on a complete circle, as shown at the left in Fig. 1, to fill a gap which would otherwise be left by the breaking of the series of segmental saws. The collars 3 are wedge-shaped, so that the faces of each collar exactly fit the oppositely-inclined sides of the saws between which it is interposed. In the shaft or arbor and in each of the collars 3 is formed a longitudinal groove, in which is a spline 5. Each of the saws is also provided with a notch 6, formed in its central opening, each of these notches being engaged by the spline 5. The saws thus supported and mounted upon the shaft or mandrel are clamped together by means of nuts 7, secured upon threaded portions of the mandrel, as at 8. If preferred, for one of these nuts may be substituted a fixed shoulder formed upon the shaft or mandrel. Between the nut and the adjacent saw is interposed a washer 9, the outer face of which is at a right angle to the shaft, while the inner face conforms to the angle of the saw against which it rests. When the two nuts are set up closely toward each other, the series of saws and interposed collars are now rigidly secured in place and in fixed relation to each other.

The operation of my device is as follows: Assuming that the cutter-head is mounted in a suitable machine for the manufacture of wood fiber and is set into rapid rotation with its shaft and assuming that the face of the log or bolt of wood to be reduced is brought into contact with the teeth of the saw, it will be seen that the overlapping saws have a twofold action upon the bolt or log—viz., the circular cut of the teeth as well as their longitudinal cut or scraping action due to the angular arrangement above described. It will also be seen that by reason of the inclination of the saws and their overlapping the longitudinal scraping of the log or bolt is in opposite directions instead of in a single direction, as in the case of that class of cutter-heads in which wabble-saws are all inclined in parallel planes, and that owing to the rapid change of direction of the longitudinal scrape of the cutter-head the strong vibration encountered in the use of wabble-saws heretofore in use is largely obviated, channels or troughs across the face of the log or bolt operated upon are avoided, and a uniform product is obtained.

Having described my invention, what I claim, and desire to secure by Letters Patent, is—

1. A cutter-head comprising a series of saws each having a toothed edge or rim formed in the arc of a circle and an untoothed edge formed as the chord of said arc, a shaft or mandrel, and means for securing said saws upon said shaft or mandrel at successively opposite angles.

2. In a cutter-head, a shaft or mandrel, a series of saws on said shaft or mandrel having their sawing edges formed in the arc of a circle, said saws being disposed at successively opposite angles with the chords of said arcs disposed in parallel planes and with the straight edge of each of said saws in contact with its neighboring saw, and means for securing said saws and said shaft or mandrel in fixed relation to each other.

3. In a cutter-head, a shaft or mandrel, a series of oppositely-inclined segmental saws upon said shaft or mandrel, collars on said mandrel interposed between the adjoining saws of said series, said collars having their end faces inclined at opposite angles, and means for securing said saws and collars upon said mandrels in fixed relation to each other.

In testimony whereof I affix my signature in presence of two witnesses.

IRA WILSON HOOVER.

Witnesses:
H. J. CHITTENDEN,
L. E. BROWN.